(12) United States Patent
Venkatachari et al.

(10) Patent No.: US 8,965,444 B2
(45) Date of Patent: Feb. 24, 2015

(54) ADJUSTING A SIGNAL-TO-INTERFERENCE RATIO TARGET BASED ON A SIGNAL CHARACTERISTIC

(75) Inventors: Harish Venkatachari, Santa Clara, CA (US); An-swol C. Hu, Santa Clara, CA (US); Rajiv R. Nambiar, San Diego, CA (US); Venkata Chalapathi Rao S. Emani, San Diego, CA (US); Ravi Gopalan, San Diego, CA (US); Sunny Arora, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 553 days.

(21) Appl. No.: 13/347,057

(22) Filed: Jan. 10, 2012

(65) Prior Publication Data

US 2013/0012254 A1 Jan. 10, 2013

Related U.S. Application Data

(60) Provisional application No. 61/441,238, filed on Feb. 9, 2011.

(51) Int. Cl.
*H04W 52/24* (2009.01)
*H04W 52/12* (2009.01)
*H04W 52/14* (2009.01)
*H04W 72/04* (2009.01)

(52) U.S. Cl.
CPC ........... *H04W 52/241* (2013.01); *H04W 52/12* (2013.01); *H04W 52/146* (2013.01); *H04W 72/0473* (2013.01)
USPC .......................................... 455/522; 370/318

(58) Field of Classification Search
CPC ..................................................... H04W 52/24
USPC ........................................... 455/522; 370/318
See application file for complete search history.

(56) References Cited

U.S. PATENT DOCUMENTS

| 7,149,486 | B2 * | 12/2006 | Kurose | 455/226.2 |
|---|---|---|---|---|
| 8,050,703 | B2 * | 11/2011 | Goto et al. | 455/522 |
| 8,159,951 | B2 * | 4/2012 | Lauderdale et al. | 370/235 |
| 8,442,513 | B2 * | 5/2013 | Krishnamurthy et al. | 455/423 |
| 8,483,742 | B2 * | 7/2013 | Kim et al. | 455/522 |
| 8,537,774 | B2 * | 9/2013 | Robson et al. | 370/331 |

(Continued)

FOREIGN PATENT DOCUMENTS

| EP | 1672939 A1 | 6/2006 |
|---|---|---|
| JP | 2004528772 A | 9/2004 |

(Continued)

OTHER PUBLICATIONS

International Search Report and Written Opinion—PCT/US2012/024379—ISA/EPO—Jul. 16, 2012.
Partial International Search Report—PCT/US2012/024379—ISA/EPO—May 4, 2012.

*Primary Examiner* — Bobbak Safaipour
(74) *Attorney, Agent, or Firm* — Joseph S. Hanasz

(57) ABSTRACT

A particular method includes transmitting a message corresponding to a reporting event detected at a mobile device, where the reporting event is associated with a network condition that decreases a likelihood of the mobile device successfully decoding a reply to the message. The method also includes, in response to transmitting the message, increasing a signal-to-interference ratio (SIR) target of the mobile device.

21 Claims, 7 Drawing Sheets

(56) References Cited

U.S. PATENT DOCUMENTS

| | | | |
|---|---|---|---|
| 8,687,494 B2 * | 4/2014 | Lauderdale et al. | 370/235 |
| 2005/0083999 A1 * | 4/2005 | Koo et al. | 375/148 |
| 2005/0085230 A1 | 4/2005 | Welnick et al. | |
| 2008/0225801 A1 | 9/2008 | Turk | |
| 2009/0268841 A1 * | 10/2009 | Kim et al. | 375/267 |
| 2010/0081469 A1 | 4/2010 | Kazmi et al. | |
| 2011/0044263 A1 | 2/2011 | El-saidny | |
| 2011/0098042 A1 | 4/2011 | Mach et al. | |
| 2011/0176593 A1 * | 7/2011 | Hultell et al. | 375/224 |
| 2011/0206009 A1 | 8/2011 | Attar et al. | |

FOREIGN PATENT DOCUMENTS

| | | |
|---|---|---|
| JP | 2007507153 A | 3/2007 |
| JP | 2008524883 A | 7/2008 |
| JP | 2009533913 A | 9/2009 |
| WO | 02082666 A2 | 10/2002 |
| WO | 2005032011 A1 | 4/2005 |
| WO | 2006063842 A1 | 6/2006 |
| WO | 2007115704 A1 | 10/2007 |
| WO | 2009086282 | 7/2009 |

* cited by examiner

Reporting Events for Potential SIR Target Adjustment

| UMTS Event | Description |
|---|---|
| 1a | Primary CPICH entering reporting range |
| 1d | Change of best cell |
| 1f | Primary CPICH < threshold |
| 2b | Estimated quality of current freq. < threshold, and estimated quality of non-used freq. > threshold |
| 2d | Estimated quality of current freq. < threshold |
| 3a | Estimated quality of current UTRAN freq. < threshold, and estimated quality of another system's freq. > threshold |
| 6a | UE transmit power > an absolute threshold |

*FIG. 2*

ADJUSTING A SIGNAL-TO-INTERFERENCE RATIO TARGET BASED ON A SIGNAL CHARACTERISTIC

CROSS-REFERENCE TO RELATED APPLICATIONS

The present application claims priority from U.S. Provisional Patent Application No. 61/441,238 filed Feb. 9, 2011, the content of which is incorporated by reference in its entirety.

BACKGROUND

1. Field

The present disclosure relates to wireless communication systems.

2. Background

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

A mobile communication device, such as User Equipment (UE) devices in wideband code division multiple access (WCDMA) systems, may report events to a wireless network. For example, mobile devices may report events based on fluctuations in strength of a received signal. Such reports may be made during hand-over and cell crossing scenarios. However, adverse radio reception conditions that trigger such reports may also degrade the mobile device's ability to decode responses from the network. For example, the network may instruct the mobile device to end an active link to a first cell and to create an active link to a second cell. If the reception conditions have deteriorated to the extent that the mobile device cannot decode the instructions, the mobile device may be unable to communicate via its assigned cell (the first cell) and may be unable to change cells. As a result, the mobile device may be dropped from the network.

In an effort to counter deteriorating network conditions, the mobile device may request that the network use more power in transmissions to the mobile device by increasing a signal-to-interference (SIR) target. Conventionally, mobile devices can increase the SIR target in response to failure to decode a message from the network. However, detecting a failure to decode a message introduces additional latency between an onset of degraded reception and an increase of the SIR target. When radio conditions deteriorate suddenly, such as during a fast cell crossing scenario, the ability of the mobile device to communicate with the network may be lost

SUMMARY

A method and apparatus to proactively adjust (e.g., increase) an SIR target based on measurement of a received signal are disclosed. For example, when a mobile device reports certain events that are associated with degraded network conditions (e.g., network conditions that decrease the likelihood of successfully decoding subsequently received messages), the mobile device may selectively increase a downlink SIR target. The SIR target may be increased based on a filtered value of a ratio of received pilot channel energy to total received energy (CPICH Ec/Io) associated with a pilot channel signal received by the mobile device from the network. The network may respond to the increased SIR target by transmitting a reply to the event report (e.g., a control acknowledgement message and/or an active set update (ASU) message) to the mobile device using increased energy on a downlink physical channel. By proactively increasing the SIR target before a reply is received, the mobile device may be more likely to successfully decode the reply in degraded network conditions, such as during fast cell crossing.

In some implementations, the CPICH Ec/Io measurements may be adaptively filtered. For example, an adaptive filter may reduce measurement noise but remain dynamic enough to account for sudden CPICH Ec/Io changes.

In a particular embodiment, a method includes increasing a signal-to-interference ratio (SIR) target of a mobile device in response to transmitting a message or event report associated with a network condition that decreases a likelihood of the mobile device successfully decoding a reply to that message. In some embodiments, the SIR target may be increased at least partially based on whether a value of a characteristic of a measured signal is within a specified range.

In another particular embodiment, a method includes adaptively filtering a ratio of received pilot channel energy to total received energy (CPICH Ec/Io) measured by a mobile device. The adaptive filtering includes reducing an averaging interval (K) of an infinite impulse response (IIR) filter during a reduction time period to provide fast adaptation to large instantaneous errors (e.g., that are likely caused by significant changes in signal quality) in a filtered value of the CPICH Ec/Io followed by regrowth of the averaging interval (K) during a regrowth time period. The regrowth time period is longer than the reduction time period. The method also includes increasing a signal-to-interference ratio (SIR) target of the mobile device at least partially based on whether the filtered value of the CPICH Ec/Io is within a specified range.

In another particular embodiment, a mobile device includes a comparator configured to determine whether a characteristic of a measured signal has a value within a specified range. The measured signal is received from a wireless network. The mobile device also includes a signal-to-interference ratio (SIR) target adjuster configured to increase a SIR target at least partially based on whether the value of the characteristic is within the specified range and in response to transmitting a message corresponding to a reporting event. The reporting event is associated with a network condition that decreases a likelihood of the mobile device successfully decoding a reply to the message.

In another particular embodiment, a network device includes a comparator configured to determine whether a characteristic of a measured signal has a value within a specified range. The measured signal is received from a mobile device via a wireless channel. The network device also includes a signal-to-interference ratio (SIR) target adjuster configured to increase a SIR target for an uplink from the mobile device at least partially based on whether the value of the characteristic is within the specified range and in response to transmitting a message to the mobile device corresponding to a reporting event. The reporting event is associated with a network condition that decreases a likelihood of the network device successfully decoding a reply to the message.

In another particular embodiment, a system includes a network device configured to send a signal and a mobile device configured to receive the signal from the network device. The mobile device is also configured to transmit a message corresponding to a reporting event, wherein the reporting event is associated with a network condition that decreases a likelihood of successfully decoding a reply to the message. The mobile device is further configured to determine whether a characteristic of the signal has a value within a specified range and to increase a signal-to-interference (SIR) target at least partially based on whether the value of the characteristic is within the specified range and in response to transmitting the message. The network device is configured to transmit a reply to the mobile device in accordance with the increased SIR target.

One particular advantage provided by at least one of the disclosed embodiments is an ability to selectively increase a SIR target in response to deteriorating network conditions that may decrease the probability of successfully decoding subsequent message.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 2 depicts a table illustrating particular examples of events that may trigger selective adjustment of a SIR target;

DETAILED DESCRIPTION

Systems and methods of requesting increased signal strength based on a characteristic of a measured signal are disclosed. To illustrate, a mobile device may detect a reporting event and transmit a message corresponding to the reporting event, where the reporting event is associated with an adverse network condition that decreases the likelihood of the mobile device successfully decoding a reply to the message. To compensate for deteriorating channel(s), the mobile device may selectively increase a signal-to-interference ratio (SIR) target. In some implementations, the mobile device may determine whether a characteristic of a measured signal has a value within a specified range, and may increase the SIR target at least partially based on whether the value of the characteristic is within the specified range. For example, the mobile device may transmit a message reporting a detected event at the mobile device. The SIR target is increased to improve reception of a reply to the message (e.g. an acknowledge message or an active set update message). The disclosed techniques may reduce network drops and/or decoding errors in situations where the same network condition that causes a mobile device to send an event report would otherwise prevent the mobile device from successfully decoding a reply to the event report.

Figure 1:
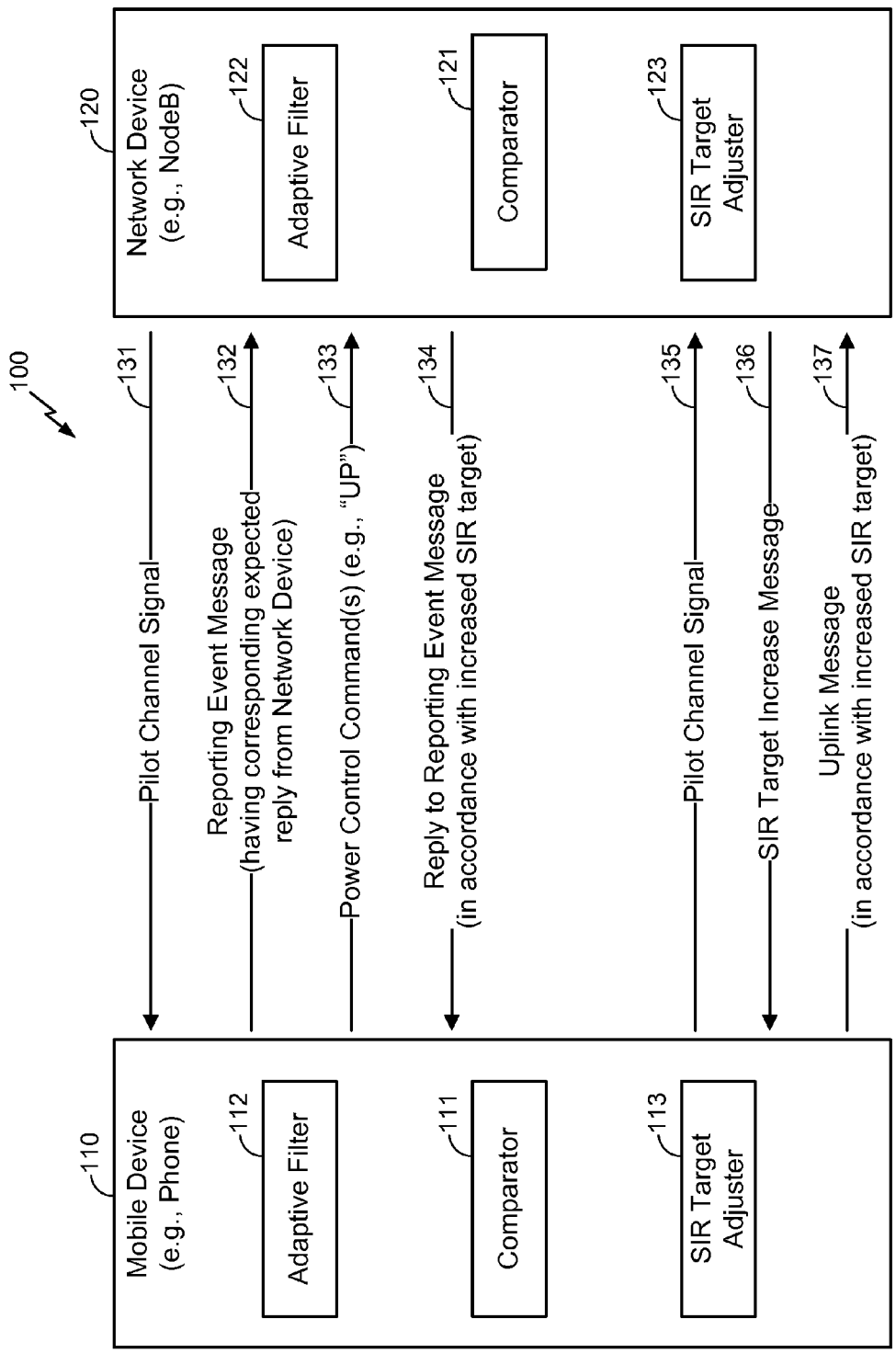
FIG. 1 is a diagram to illustrate a particular embodiment of a system that is operable to selectively adjust a signal-to-interference ratio (SIR) target.

Referring to FIG. 1, a particular embodiment of a system 100 that is operable to selectively adjust a SIR target is depicted. The system 100 includes a mobile device 110 communicably coupled to a network device 120. In a particular embodiment, the mobile device 110 may be a wireless phone and the network device 120 may be a base station, NodeB, or other network-side component that is in communication with the mobile device 110 via a wireless network.

Generally, as used herein, "network" may collectively identify various network elements, such as servers, controllers, and other hardware/software utilized in implementing a wireless communication network. Network technologies used to implement a wireless communication network may include, but are not limited to, long term evolution (LTE), global system for mobile communications (GSM), general packet radio service (GPRS), enhanced data rates for GSM evolution (EDGE), universal mobile telecommunications system (UMTS), UMTS terrestrial radio access network (UTRAN), generic radio access network (GRAN), evolution-data optimized (1x/DO), wideband code division multiple access (WCDMA), Worldwide Interoperability for Microwave Access (WiMAX), one or more other radio access technologies, or any combination thereof.

The mobile device 110 may include a comparator 111. In a particular embodiment, the comparator 111 is configured to determine whether a characteristic of a measured signal has a value within a specified range. For example, the mobile device 110 may receive a pilot channel signal 131 from the network device 120 via a wireless network and the mobile device 110 may measure one or more characteristics of the pilot channel signal 131. In a particular embodiment, the one or more characteristics include a ratio of received pilot channel energy to total received energy (CPICH Ec/Io). The mobile device 110 may perform sequential measurements of incoming signals to generate the CPICH Ec/Io value.

An adaptive filter 112 (e.g., an infinite impulse response (IIR) filter coupled with an adaptation algorithm) may produce a filtered value of the measured CPICH Ec/Io. Generally, the adaptive filter 112 may provide fast adaptation to large instantaneous errors followed by relatively slow regrowth of an averaging interval (e.g., to prevent SIR target adjustment due to spurious signal strength fluctuations). The adaptive filter 112 may perform sufficient averaging to reduce the noise of CPICH Ec/Io measurements but may be dynamic enough to account for sudden CPICH Ec/Io changes. An exemplary adaptation algorithm is further described with reference to FIGS. 4-6. The comparator 111 may compare the filtered CPICH Ec/Io value to a specified range. In an illustrative embodiment, the filtered CPICH Ec/Io value is within the specified range when the filtered CPICH Ec/Io value is less than or equal to −14 dB, indicating weakened downlink signal reception. In alternate embodiments, the specified range may be a limited range (e.g., −14 dB to −20 dB) instead of an open-ended range (e.g., <=−14 dB).

The mobile device 110 may also include a signal-to-interference ratio (SIR) target adjuster 113. The SIR target adjuster 113 may increase a SIR target for a downlink to the mobile device 110 from the network device 120 at least partially based on the comparator 111 determining that the filtered value of the CPICH Ec/Io is within the specified range (e.g., less than or equal to −14 dB). In a particular embodiment, the mobile device 110 may increase the SIR target by adjusting power control command(s) 133 (e.g., "UP" commands) that are transmitted to the network device 120.

In a particular embodiment, the SIR target adjuster 113 may increase the SIR target in response to the mobile device 110 transmitting a message to the network device 120, where the message corresponds to a network condition that decreases a likelihood of the mobile device 110 successfully decoding a reply to the message. To illustrate, the mobile device 110 may be configured to report certain events in accordance with one or more networking standards. Particular examples of reporting events are further described with reference to FIG. 2. When a reporting event occurs, the mobile device 110 may transmit a reporting event message 132 to the network device 120 and may expect to receive a corresponding reply 134 from the network device 120. The reply 134 may be an acknowledgement message, an active set update (ASU) message, or any combination thereof. When the reporting event has been caused by degraded network conditions, the degraded network conditions may prevent the mobile device 110 from successfully decoding the reply 134, which may result in the mobile device 110 being dropped from the network. However, when the mobile device 110 has previously increased the SIR target, the network device 120 may transmit the reply 134 at an increased power level in accordance with the increased SIR, which may enable the mobile device 110 to successfully decode the reply 134 even in degraded network conditions. In a particular embodiment, the SIR target may be increased conditioned upon determining that the filtered value of the CPICH Ec/Io is within the specified range (e.g., less than or equal to −14 dB) within an evaluation time window after detecting the reporting event at the mobile device 110, as further described with reference to FIGS. 4-5. Alternately, the SIR target may be adjusted in response to the network condition or reporting event independent of measured signal characteristics.

During operation, the mobile device 110 may encounter an adverse situation in which the mobile device 110 is unable to decode downlink protocol data unit (PDU) transmissions, such as control acknowledgements and ASUs that are sent in response to particular reporting events. For example, such events may include UMTS event 1a, which may indicate a fast cell crossing scenario (e.g., the mobile device 110 is rapidly crossing from one cell of a wireless network to another cell of the wireless network). During fast cell crossing, a "current" cell's CPICH Ec/Io may drastically drop within 140-180 milliseconds from transmission of the uplink PDU (e.g., the message 132) reporting the event. Thus, the mobile device 110 may be unable to decode the reply 134 to the message 132.

To remedy this situation, the mobile device 110 may increase downlink SIR target. The SIR target may be increased in response to transmitting the message 132 and in response to determining, at the comparator 111, that a filtered value of CPICH Ec/Io produced by the adaptive filter 112 is within a specified range (e.g., less than or equal to −14 dB). When the network device 120 transmits the reply 134 in accordance with the increased SIR, the mobile device 110 may successfully decode the reply 134. For example, the reply 134 may include an active set update (ASU) instructing the mobile device 110 to terminate an active link with the current cell associated with poor signal strength and establish an active link with a new cell having improved signal strength.

Although described above with respect to the mobile device 110 increasing a downlink SIR target, it should be noted that the network device 120 may similarly increase an uplink SIR target. For example, the network device 120 may include a comparator 121, an adaptive filter 122, and a SIR target adjuster 123. The comparator 121 may determine whether a filtered value of a characteristic of a measured signal from the mobile device 110 (e.g., a pilot channel signal 135) is within a specified range. When the filtered value is within the specified range, the network device 120 may increase an uplink power level target. The mobile device 110 may transmit a subsequent uplink message 137 in accordance with the increased SIR target.

In particular embodiments, one or more of the comparator 111, the comparator 121, the adaptive filter 112, the adaptive filter 122, the SIR target adjuster 113, and the SIR target adjuster 123 may be implemented using hardware or software. In software implementations, one or more of the aforementioned components may be implemented using instructions stored in a processor-readable medium (e.g., a memory) that are executable by a processor, as further described with reference to FIG. 7.

The system 100 of FIG. 1 may thus enable proactive adjustment of SIR target levels in response to network conditions that decrease a likelihood of successfully decoding subsequently received messages. In some implementations, the SIR target increase may be based on whether a signal characteristic is within a specified range. Moreover, by conditioning a SIR target increase on adaptive filter output instead of merely CPICH Ec/Io measurement, the system 100 may avoid possible capacity reduction when multiple mobile devices behave similarly (e.g., request SIR target increases at similar times in similar conditions). The system 100 of FIG. 1 may thus reduce an overall frequency of network drops experienced by users of mobile devices.

FIG. 2 depicts a table 200 of particular examples of UMTS radio resource control (RRC) protocol events. Each of the events, when transmitted by a mobile device, may trigger a corresponding reply from a network device. In addition, each of the events may indicate degraded or quickly degrading network conditions. Such network conditions may decrease a likelihood of successfully decoding a received message (e.g., a reply to a transmitted message), and may thus trigger selective adjustment of SIR target levels in accordance with the techniques disclosed herein.

UMTS RRC protocol events that may trigger SIR target adjustment may include events 1a, 1d, 1f, 2b, 2d, 3a, and 6a. Definitions for UMTS RRC protocol events may be found in $3^{rd}$ Generation Partnership Project (3GPP) specifications at www.3gpp.org.

It should be noted that the UMTS RRC protocol events illustrated in FIG. 2 are examples only. In particular embodiments, different UMTS RRC protocol events may trigger selective adjustment of a SIR target. Further, when a system other than UMTS is in use, different events associated with that particular system may trigger SIR target adjustment. Thus, various events including but not limited to the ones that are associated with degraded wireless channel conditions may trigger selective SIR target adjustment as described herein.

Figure 3:
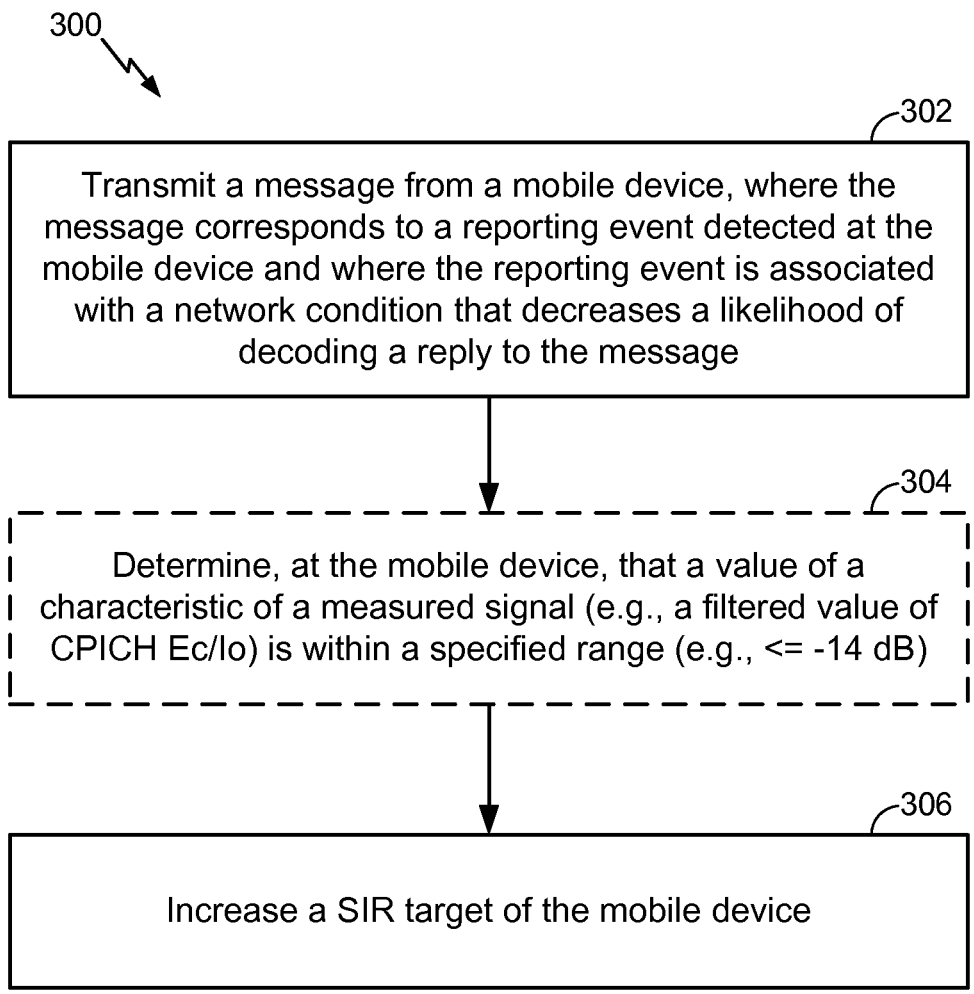
FIG. 3 is a flowchart to illustrate a particular embodiment of a method of selectively adjusting a SIR target.

FIG. 3 is a flowchart to illustrate a particular embodiment of a method 300 of adjusting a SIR target. In an illustrative embodiment, the method 300 may be performed at the system 100 of FIG. 1.

The method 300 may include transmitting a message from a mobile device, at 302. The message may correspond to a reporting event detected at the mobile device, where the reporting event is associated with a network condition that decreases a likelihood of successfully decoding a reply to the message. For example, in FIG. 1, the mobile device 110 may transmit the message 132 to the network device 120.

The method 300 may optionally include determining, at the mobile device, that a value of a characteristic of a measured signal is within a specified range, at 304. In a particular embodiment, the value may be a filtered value of CPICH Ec/Io, and the value may be within the specified range when the value is less than or equal to −14 dB. For example, in FIG. 1, the comparator 111 may determine that a filtered CPICH Ec/Io value produced by the adaptive filter 112 is less than or equal to −14 dB.

The method 300 may further include increasing a SIR target of the mobile device, at 306. When the method 300 includes determining that the filtered CPICH Ec/Io value is within the specified range, the SIR target adjustment may be performed at least partially based on the determination. Alternately, the SIR target may be adjusted in response to the adverse network condition independent of any measured signal characteristic.

In particular embodiments, an adaptive filter, such an infinite impulse response (IIR) filter, may be used to provide fast adaptation to large instantaneous errors followed by relatively slow regrowth of an averaging interval (K). To illustrate, a filtered value of CPICH Echo may be determined according to a filter averaging interval α (alpha) that is determined at least partially based on whether a difference between a measured CPICH Echo and a filtered CPICH Echo exceeds a difference threshold (e.g., 3). For example, x(k) may denote a $k^{th}$ value of a measured CPICH Echo and y(k) may denote a $k^{th}$ value of the filtered CPICH Ec/Io. When a difference between x(k) and y(k) exceeds the difference threshold (e.g. |y(k)−x(x)|>3), the pilot channel strength may be rapidly changing. In response to the difference between the measured CPICH Ec/Io and the filtered CPICH Echo exceeding the difference threshold while the value of the averaging interval (K) is greater than a lower limit, the value of the filter averaging interval (α) may be increased. Otherwise, in response to the difference between the measured CPICH Ec/Io and the filtered CPICH E/Io not exceeding the difference threshold for a predefined number of sequential comparisons while the value of the averaging interval (K) is less than an upper limit, the value of the filter averaging interval (α) may be decreased.

Adaptive filtering of CPICH E/Io can include reducing the averaging interval (K) during a reduction time period to provide fast adaptation to large instantaneous errors in the filtered value of the CPICH Ea/Io, followed by regrowth of the averaging interval (K) during a regrowth time period, where the regrowth time period is longer than the reduction time period. Thus, a SIR target may be increased conditioned upon determining that a value (e.g., filtered CPICH Ea/Io) is within the specified range within an evaluation time window after detection of a reporting event (e.g., UMTS RRC protocol event 1a, 2b, 3a, 2d, 1d, 1f, or 6a). If the filtered value of the CPICH Echo falls within the specified range (e.g., is less than or equal to −14 dB), the SIR target can be increased and the evaluation time window may be truncated. As a result, SIR target increases due to reporting events may occur based on CPICH Ec/Io measurements soon after reporting events are detected, and only a single SIR target increase may occur per reporting event.

In an illustrative embodiment, the adaptive filtering may be performed on raw CPICH Ec/Io values that are provided to the adaptive filter by a searcher (e.g., every 20 milliseconds, periodically after a variable time interval, and/or whenever available) in accordance with the following pseudocode:

```
K = 8; alpha = [1/K];
y1(0) = <INIT>;
regrowthTimer = 0;
for each new reading x(k)
    //Update alpha to current error
    if (abs(y(k−1) − x(k)) >= 3 (in dB))
        K = max(4, ceil(K/2)); //AlphaLimit = 4 (default)
        regrowthTimer = 0; //Reset regrowth timer after growing
    else
        regrowthTimer = regrowthTimer + 1;
        if (regrowthTimer == 8) //Check RegrowthFactor 4 times before
        decreasing alpha
            K = min(8, K+1);
            regrowthTimer = 0; %Reset regrowth timer after growing
        end
    end
    alpha = 1/K;
    y(k) = x(k)*alpha + (1 − alpha)*y(k−1); //Filter with updated alpha
end
```

The above pseudocode may be bound for a list of events (events identified by the table of FIG. 2). Once a UE triggers any event in the list of events, the UE may move into a period of evaluation (EvalWindow) of CPICH Ec/Io based on the filter defined by the above pseudocode. In a particular embodiment, the period of evaluation (e.g., evaluation window) may be equal to 400 milliseconds. When the filtered CPICH Ec/Io is less than or equal to −14 dB within the evaluation window, the UE may increase the SIR target by 1 dB:

```
On Event transmission set Event time stamp, start evaluation window
    If y(k) <= −14 (in dB) && (current time − Event time
    stamp) <= EvalWindow
        Update (SIR Target) by up to 1 dB
        Stop evaluation window
    End
```

Figure 4:
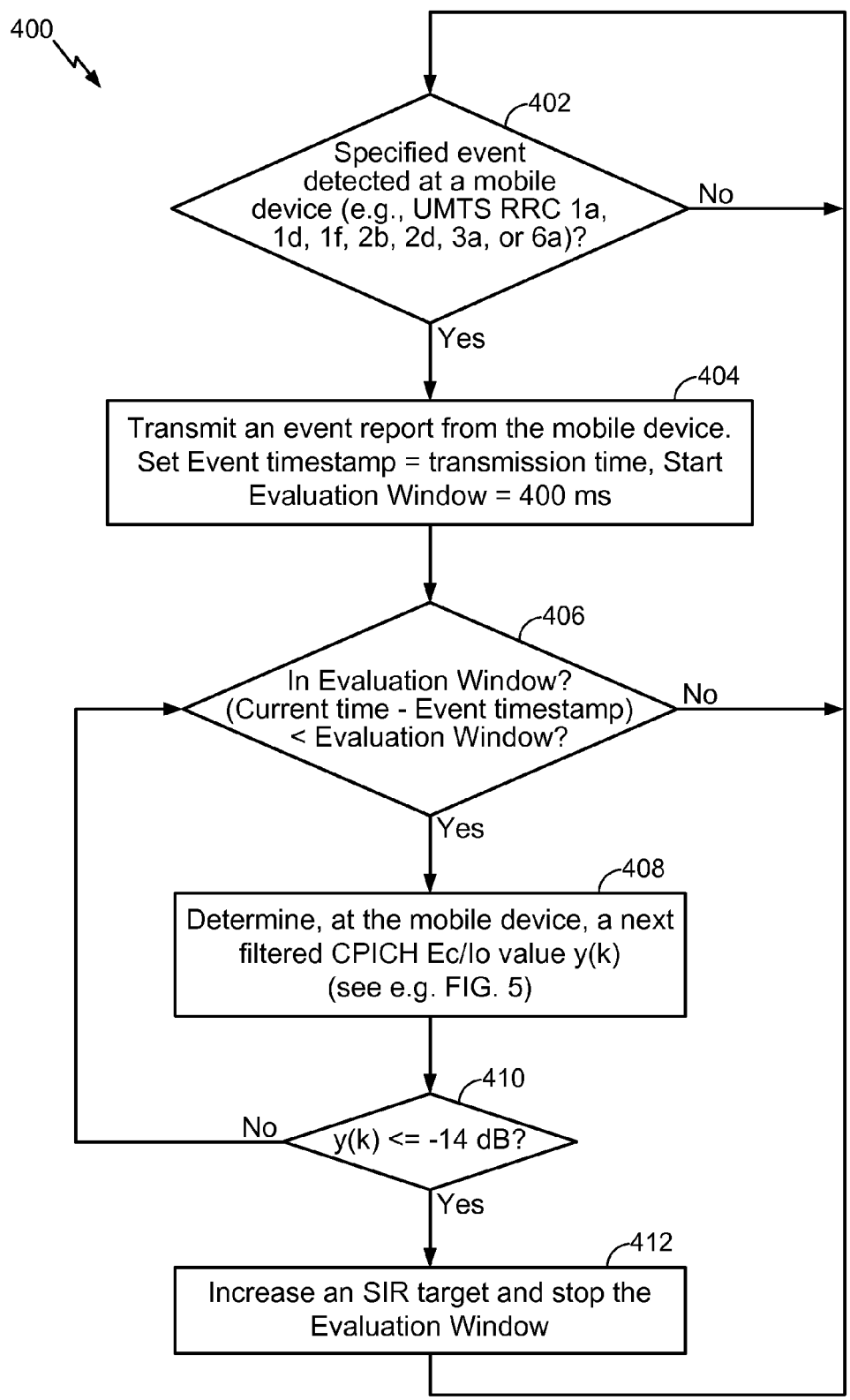
FIG. 4 is a flowchart to illustrate another particular embodiment of a method of selectively adjusting a SIR target.

FIG. 4 is a flowchart illustrating a particular embodiment of a method 400 of selectively increasing a SIR target in accordance with the above pseudocode. In an illustrative embodiment, the method 400 may be performed at the system 100 of FIG. 1.

The method 400 may include determining whether a specified event is detected at a mobile device, at 402. In a particular embodiment, the specified event may be any of UMTS RRC protocol event 1a, 1d, 1f, 2b, 2d, 3a, or 6a. For example, referring to FIG. 1, the mobile device 110 may determine whether a specified reporting event is detected.

When it is determined that a specified reporting event is not detected, the method 400 may return to 402. When it is determined that a specified reporting event is detected, the method 400 may include transmitting an event report from the mobile device, at 404. For example, referring to FIG. 1, the mobile device 110 may transmit the message 132 reporting the event. Further, in accordance with the above pseudocode, an event timestamp may be set to a transmission time of the event report and an evaluation window of 400 milliseconds may be started.

Advancing to 406, the method 400 may include determining whether the mobile device is within the evaluation window. That is, the mobile device may determine whether the difference between a current time and the event timestamp is less than the evaluation window. When the mobile device is no longer within the evaluation window, the method 400 may return to 402.

When the mobile device is within the evaluation window, the method 400 may include determining, at the mobile device, a next filtered CPICH Ec/Io value y(k), at 408. For example, referring to FIG. 1, the adaptive filter 112 may determine a next filtered CPICH Ec/Io value. In an illustrative embodiment, the value y(k) may be determined in accordance with the method of FIG. 5.

Continuing to 410, the method 400 may include determining whether the filtered CPICH Ec/Io value y(k) is less than or equal to −14 dB. When y(k) is not less than or equal to −14 dB, the method 400 may return to 406. When y(k) is less than or equal to −14 dB, the method 400 may include increasing an SIR target and stopping the evaluation window, at 412.

Figure 5:
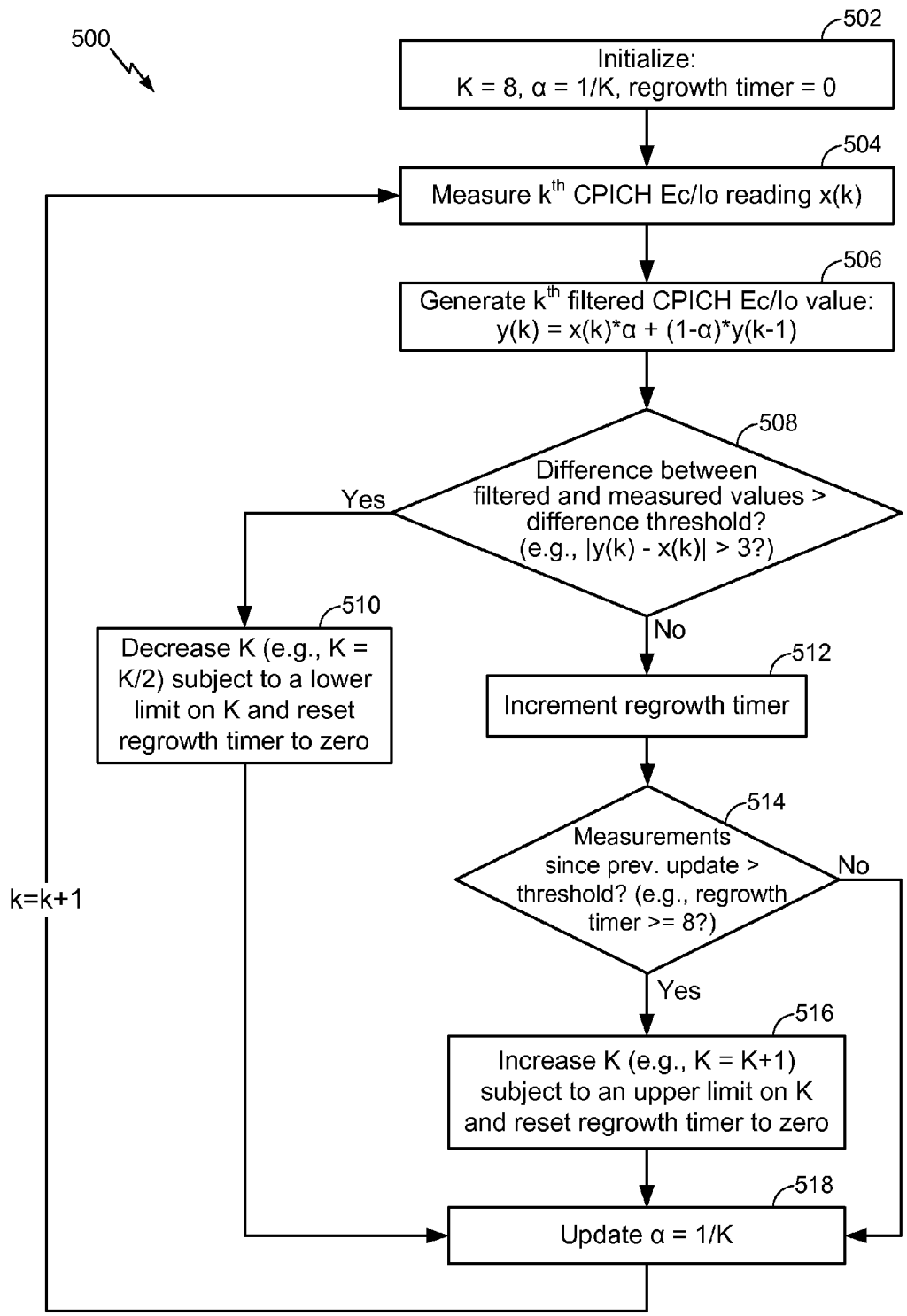
FIG. 5 is a flowchart to illustrate a particular embodiment of a method of adaptively filtering a value of a characteristic of a measured signal.

FIG. 5 is a flowchart to illustrate a particular embodiment of a method 500 of determining a next filtered CPICH Ec/Io value. In an illustrative embodiment, the method 500 may be performed by the adaptive filter 112 of FIG. 1.

The method 500 may include initializing a variable K to 8, a filter averaging interval alpha ($\alpha$) to 1/K, and a regrowth timer to zero, at 502. Advancing to 504, a $k^{th}$ CPICH Ec/Io reading x(k) may be measured. Continuing to 506, a $k^{th}$ filtered CPICH Ec/Io value may be generated in accordance with the formula y(k)=x(k)*$\alpha$+(1−$\alpha$)*y(k−1).

The method 500 may include determining whether a difference between the filtered and measured values of CPICH Ec/Io (i.e., |y(k)−x(k)|) is greater than a difference threshold, at 508. In a particular embodiment, the difference threshold may be 3. In alternate embodiments, the difference threshold may be another value. When the difference is greater than the difference threshold, the method 500 may include decreasing K (e.g., by half) subject to a lower limit on K and resetting the regrowth timer to zero, at 510. The method 500 may continue and update $\alpha$ to 1/K, at 518, and return to 504.

When the difference is less than the difference threshold, the method 500 may include incrementing the regrowth timer, at 512. Advancing to 514, the method 500 may include determining whether the regrowth timer has exceeded a predetermined number of measurements since a previous filter coefficient change. When the regrowth timer has not exceeded the predetermined number, the method 500 may include updating $\alpha$ to 1/K, at 518, and may return to 504. When the regrowth timer has exceeded the predetermined number, the method 500 may include increasing K (e.g., by one) subject to an upper limit on K and resetting the regrowth timer to zero, at 516. The method 500 may continue and update $\alpha$ to 1/K, at 518, increment k (e.g., k=k+1), and return to 504.

Figure 6:
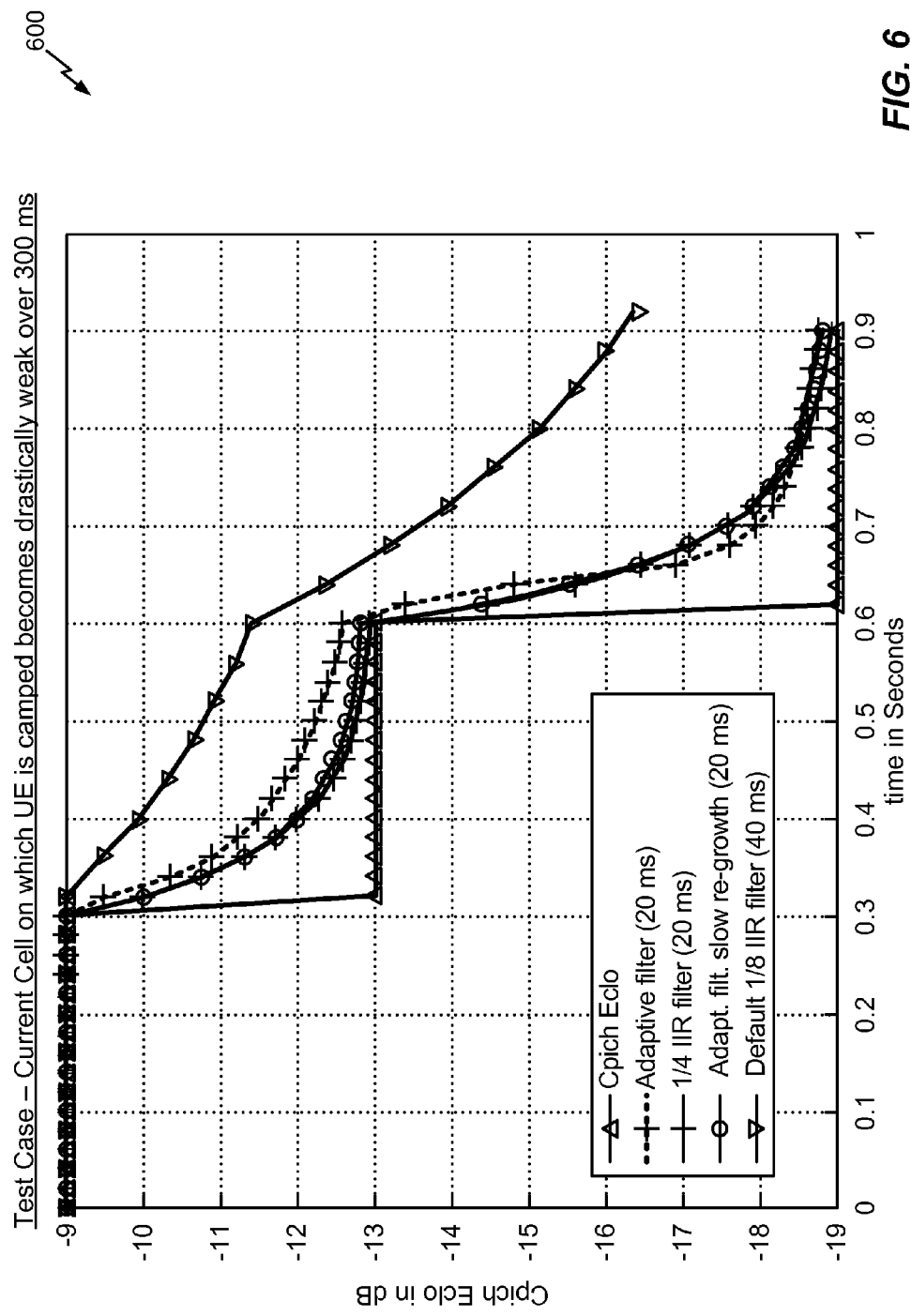
FIG. 6 depicts a graph illustrating response curves of particular filters that may be used in determining whether to adjust a SIR target.

FIG. 6 depicts a graph 600 illustrating response curves of particular filters that may be used to adjust a SIR target, including the adaptive filter described with reference to the methods of FIGS. 4-5 (designated "Adapt. filt. slow re-growth (20 ms)"). Also shown are response curves of a default ⅛ IIR filter, a default ¼ IIR filter, and an adaptive filter with faster re-growth. In particular, FIG. 6 illustrates filter response curves when a current cell on which a UE is camped becomes drastically weak over a 300 millisecond time period. It will thus be appreciated that adaptive filtering parameters may be experimentally determined to achieve a preferred response curve that reduces measurement noise to an acceptable level while remaining dynamic enough to trigger a SIR target increase in rapidly deteriorating network conditions (e.g., during fast cell crossing).

It should be noted that in certain situations the above adaptive filtering algorithm may potentially de-stabilize outer loop power control (OLPC) behavior that is typically based on only cyclic redundancy check (CRC) and block error ratio (Bler)/block error rate test (Blert). Thus, the algorithm may additionally be bound so that OLPC can converge to existing requirements. Convergence may not occur when multiple events are reported within short intervals of each other when CPICH Ec/Io is still low. Thus, an additional timer may be used, during which the above adaptive filtering algorithm may be disabled from changing a SIR target (see pseudocode below):

At OLPC Init:

Compute frame timer limit Tlim=Max {over all transmission channels (2*(1−Blert)/Blert*TTI_Length$_{in\_Frames}$)}

After SIR target increase:
Start Frame Timer t=0
while t<Tlim, disable SIR target increase triggered by event reporting It should be noted that in the case of transport format combination indicator (TFCI) transmissions, a more robust timer may be used that accounts for channels entering or leaving dormancy.

Figure 7:
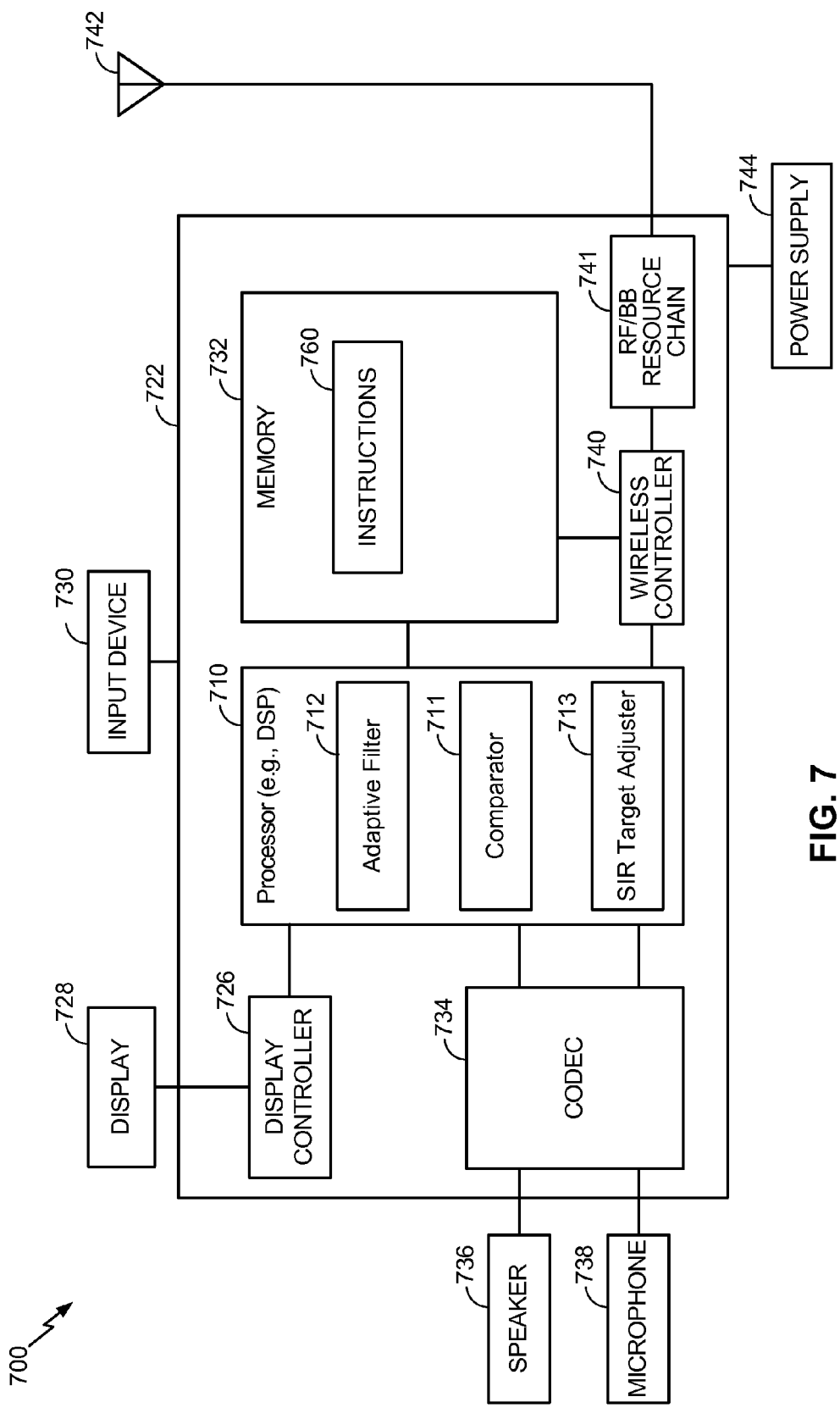
FIG. 7 is a block diagram of a wireless device operable to selectively adjust a SIR target.

FIG. 7 is a block diagram of a mobile communication device 700. In one embodiment, the mobile communication device 700, or components thereof, include or are included within the mobile device 110 of FIG. 1. Further, all or part of the pseudocode described herein and methods illustrated in FIGS. 3-5 may be performed at or by the mobile communication device 700. The mobile communication device 700 includes a processor 710, such as a digital signal processor (DSP), coupled to a memory 732.

The memory 732 may be a non-transitory tangible processor-readable storage medium that stores instructions. The instructions may be executable by the processor 710 to perform one or more functions or methods described herein. For example, the memory 732 may include instructions 760 executable by the processor 710 to perform one or more of the methods illustrated in FIGS. 3-5. Alternately, or in addition, the processor 710 may include hardware implementations of one or more of the methods illustrated in FIGS. 3-5, such as field programmable gate array (FPGA) implementations, firmware implementations, controller-based implementations, etc. To illustrate, the processor 710 may include a comparator 711 (e.g., the comparator 111 of FIG. 1), an adaptive filter 712 (e.g., the adaptive filter 112 of FIG. 1), and a SIR target adjuster 713 (e.g., the SIR target adjuster 113 of FIG. 1). In particular embodiments, the methods of FIGS. 3-5 may be partially implemented by software and partially implemented by hardware.

FIG. 7 also shows a display controller 726 that is coupled to the processor 710 and to a display 728. A coder/decoder (CODEC) 734 can also be coupled to the processor 710. A speaker 736 and a microphone 738 can be coupled to the CODEC 734. FIG. 7 also indicates that a wireless controller 740 can be coupled to the processor 710 and to a radio frequency-baseband (RF-BB) resource chain 741 that may be in communication with at least one wireless antenna 742.

In a particular embodiment, the processor 710, the display controller 726, the memory 732, the CODEC 734, the wireless controller 740, and the RF-BB resource chain 741 are included in a system-in-package or system-on-chip device 722. In a particular embodiment, an input device 730 and a power supply 744 are coupled to the system-on-chip device 722. Moreover, in a particular embodiment, as illustrated in FIG. 7, the display device 728, the input device 730, the speaker 736, the microphone 738, the wireless antenna 742, and the power supply 744 are external to the system-on-chip device 722. However, each of the display device 728, the input device 730, the speaker 736, the microphone 738, the wireless antenna 742, and the power supply 744 can be coupled to a component of the system-on-chip device 722, such as an interface or a controller.

In conjunction with the disclosed embodiments, an apparatus is disclosed that includes means for determining whether a characteristic of a measured signal has a value within a specified range. The measured signal is received via a wireless network. For example, the means for determining may include the comparator 111 of FIG. 1, the adaptive filter 112 of FIG. 1, the comparator 121 of FIG. 1, the adaptive filter 122 of FIG. 1, the comparator 711 of FIG. 1, the adaptive filter 712 of FIG. 7, one or more other devices configured to determine whether a characteristic of a measured signal has a value within a specified range, or any combination thereof.

The apparatus also includes means for increasing a SIR target at least partially based on whether the value of the characteristic is within the specified range and in response to transmission of a message corresponding to a reporting event, where the reporting event is associated with a network condition that decreases a likelihood of decoding a reply to the message. For example, the means for increasing a SIR target may include the SIR target adjuster 113 of FIG. 1, the SIR target adjuster 123 of FIG. 1, the SIR target adjuster 713 of FIG. 7, or any combination thereof.

In a particular embodiment, at least one of the means for determining and the means for increasing may be integrated into a mobile device, such as the mobile device 110 of FIG. 1 or the mobile communication device 700 of FIG. 7. In another particular embodiment, at least one of the means for determining and the means for increasing may be integrated into a network device, such as the network device 120 of FIG. 1.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software executable by a processor depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   transmitting a message corresponding to a reporting event at a mobile device, wherein the reporting event is associated with a network condition that decreases a likelihood of the mobile device successfully decoding a reply to the message; and
   in response to transmitting the message, increasing a signal-to-interference ratio (SIR) target of the mobile device,
      wherein the SIR target of the mobile device is increased at least partially based on whether a value of a characteristic of a measured signal is within a specified range, and
      wherein the SIR target is increased conditioned upon determining that the value of the characteristic is within the specified range within an evaluation time window after detection of the reporting event at the mobile device.

2. The method of claim 1, further comprising determining, at the mobile device, whether the value of the characteristic of the measured signal is within the specified range, wherein the measured signal is received from a network device of a wireless network.

3. The method of claim 1, wherein the measured signal includes a pilot channel signal.

4. The method of claim 3, wherein the value of the characteristic includes a filtered value of a ratio of received pilot channel energy to total received energy (CPICH Ec/Io) measured by the mobile device.

5. The method of claim 4, wherein the filtered value of the CPICH Echo is within the specified range when the filtered value of the CPICH Echo is less than or equal to −14 dB.

6. The method of claim 4, wherein the filtered value of the CPICH Echo is determined according to a value of a filter averaging interval ($\alpha$) that is determined at least partially based on whether a difference between a measured CPICH Ec/Io and a filtered CPICH Ec/Io exceeds a difference threshold.

7. The method of claim 6, wherein the difference threshold is equal to 3.

8. The method of claim 6, further comprising:
   in response to the difference between the measured CPICH Echo and the filtered CPICH Ec/Io exceeding the difference threshold while the value of an averaging interval (K) is greater than a lower limit, increasing the value of the filter averaging interval ($\alpha$); and
   in response to the difference between the measured CPICH Ec/Io and the filtered CPICH Ec/Io not exceeding the difference threshold for a predefined number of sequential comparisons while the value of the averaging interval (K) is less than an upper limit, decreasing the value of the filter averaging interval ($\alpha$).

9. The method of claim 1, wherein the reply includes at least one of an acknowledgement message and an active set update message.

10. A method comprising:
    adaptively filtering a ratio of received pilot channel energy to total received energy (CPICH Ec/Io) measured by a mobile device, wherein the adaptive filtering includes reducing an averaging interval (K) of an infinite impulse response (IIR) filter during a reduction time period to provide fast adaptation to large instantaneous errors in a filtered value of the CPICH Ec/Io followed by regrowth of the averaging interval (K) during a regrowth time period, wherein the regrowth time period is longer than the reduction time period; and increasing a signal-to-interference ratio (SIR) target of the mobile device at least partially based on whether the filtered value of the CPICH Ec/Io is within a specified range.

11. The method of claim 10, further comprising determining, at the mobile device, whether the filtered value of the CPICH Ec/Io is within the specified range.

12. A mobile device comprising:
a comparator configured to determine whether a characteristic of a measured signal has a value within a specified range, the measured signal received from a network device of a wireless network; and
a signal-to-interference ratio (SIR) target adjuster configured to increase a SIR target at least partially based on whether the value of the characteristic is within the specified range within an evaluation time window after detection of a reporting event and in response to transmitting a message corresponding to the reporting event, wherein the reporting event is associated with a network condition that decreases a likelihood of the mobile device successfully decoding a reply to the message.

13. The mobile device of claim 12, wherein the measured signal includes a pilot signal and wherein the value of the characteristic includes a filtered value of a ratio of received pilot channel energy to total received energy (CPICH Ec/Io).

14. A network device comprising:
a comparator configured to determine whether a characteristic of a measured signal has a value within a specified range, the measured signal received from a mobile device via a wireless channel; and
a signal-to-interference ratio (SIR) target adjuster configured to increase a SIR target for an uplink from the mobile device at least partially based on whether the value of the characteristic is within the specified range and in response to transmitting a message to the mobile device corresponding to a reporting event, wherein the reporting event is associated with a network condition that decreases a likelihood of the network device successfully decoding a reply to the message, and wherein the SIR target is increased conditioned upon determining that the value of the characteristic is within the specified range within an evaluation time window after detection of the reporting event.

15. The network device of claim 14, wherein the measured signal includes a pilot channel signal and wherein the value of the characteristic includes a filtered value of a ratio of received pilot channel energy to total received energy (CPICH Ec/Io).

16. An apparatus comprising:
means for determining whether a characteristic of a measured signal has a value within a specified range, the measured signal received via a wireless network; and
means for increasing a signal-to-interference ratio (SIR) target of a mobile device at least partially based on whether the value of the characteristic is within the specified range and in response to transmission of a message corresponding to a reporting event, wherein the reporting event is associated with a network condition that decreases a likelihood of decoding a reply to the message, and wherein the SIR target is increased conditioned upon determining that the value of the characteristic is within the specified range within an evaluation time window after detection of the reporting event at the mobile device.

17. The apparatus of claim 16, wherein the measured signal includes a pilot channel signal.

18. A non-transitory processor-readable medium comprising instructions that, when executed by a processor, cause the processor to:
transmit a message corresponding to a reporting event at a mobile device, wherein the reporting event is associated with a network condition that decreases a likelihood of the mobile device successfully decoding a reply to the message; and
in response to transmitting the message, increase a signal-to-interference ratio (SIR) target of the mobile device, wherein the SIR target of the mobile device is increased at least partially based on whether a value of a characteristic of a measured signal is within a specified range, and wherein the SIR target is increased conditioned upon determining that the value of the characteristic is within the specified range within an evaluation time window after detection of the reporting event at the mobile device.

19. The non-transitory processor-readable medium of claim 18, wherein the reply includes at least one of an acknowledgement message and an active set update message, and wherein the measured signal includes a pilot channel signal.

20. A method comprising:
sending, by a network device, a signal that is received by a mobile device;
transmitting, by the mobile device, a message corresponding to a reporting event, wherein the reporting event is associated with a network condition that decreases a likelihood of successfully decoding a reply to the message;
determining, at the mobile device, whether a characteristic of the signal has a value within a specified range;
increasing a signal-to-interference ratio (SIR) target at least partially based on whether the value of the characteristic is within the specified range within an evaluation time window after detection of the reporting event and in response to transmitting the message; and
transmitting, by the network device, the reply to the mobile device in accordance with the increased SIR target.

21. A system comprising:
a network device configured to send a signal; and
a mobile device configured to:
receive the signal from the network device;
transmit a message corresponding to a reporting event, wherein the reporting event is associated with a network condition that decreases a likelihood of successfully decoding a reply to the message;
determine whether a characteristic of the signal has a value within a specified range; and
increase a signal-to-interference ratio (SIR) target at least partially based on whether the value of the characteristic is within the specified range within an evaluation time window after detection of the reporting event and in response to transmitting the message,
wherein the network device is further configured to transmit the reply to the mobile device in accordance with the increased SIR target.

* * * * *

UNITED STATES PATENT AND TRADEMARK OFFICE
CERTIFICATE OF CORRECTION

PATENT NO. : 8,965,444 B2  Page 1 of 1
APPLICATION NO. : 13/347057
DATED : February 24, 2015
INVENTOR(S) : Harish Venkatachari et al.

It is certified that error appears in the above-identified patent and that said Letters Patent is hereby corrected as shown below:

In the Specification

Column 7, line 23: "Echo" should be --$Ec/Io$--.
Column 7, line 26: "Echo and a filtered CPICH Echo" should be --$Ec/Io$ and a filtered CPICH $Ec/Io$--.
Column 7, line 28: "Echo" should be --$Ec/Io$--.
Column 7, line 34: "Echo" should be --$Ec/Io$--.
Column 7, line 39: "E/Io" should be --$Ec/Io$--.
Column 7, line 44: "E/Io" should be --$Ec/Io$--.
Column 7, line 47: "Ea/Io" should be --$Ec/Io$--.
Column 7, line 51: "Ea/Io" should be --$Ec/Io$--.
Column 7, line 56: "Echo" should be --$Ec/Io$--.

In the Claims

Claim 5, line 39: "Echo" should be --$Ec/Io$--.
Claim 5, line 40: "Echo" should be --$Ec/Io$--.
Claim 6, line 42: "Echo" should be --$Ec/Io$--.
Claim 8, line 51: "Echo" should be --$Ec/Io$--.

Signed and Sealed this
Twenty-first Day of July, 2015

Michelle K. Lee
*Director of the United States Patent and Trademark Office*